(12) United States Patent
Juels et al.

(10) Patent No.: US 8,505,097 B1
(45) Date of Patent: Aug. 6, 2013

(54) REFRESH-AND-ROTATION PROCESS FOR MINIMIZING RESOURCE VULNERABILITY TO PERSISTENT SECURITY THREATS

(75) Inventors: Ari Juels, Brookline, MA (US); Orran Krieger, Newton, MA (US); Dennis Moreau, Providence, RI (US)

(73) Assignee: EMC Corporation, Hopkinton, MA (US)

( * ) Notice: Subject to any disclaimer, the term of this patent is extended or adjusted under 35 U.S.C. 154(b) by 99 days.

(21) Appl. No.: 13/173,877

(22) Filed: Jun. 30, 2011

(51) Int. Cl.
*G06F 7/04* (2006.01)
*G06F 11/00* (2006.01)

(52) U.S. Cl.
USPC .............. 726/23; 726/24; 726/25; 726/26; 713/183; 713/184; 713/185; 713/186; 713/187

(58) Field of Classification Search
USPC ........................................... 726/23
See application file for complete search history.

(56) References Cited

U.S. PATENT DOCUMENTS

| | | | |
|---|---|---|---|
| 8,276,201 B2 * | 9/2012 | Schunter et al. | 726/22 |
| 2003/0110205 A1 * | 6/2003 | Johnson | 709/104 |

OTHER PUBLICATIONS

U.S. Appl. No. 12/982,288, filed in the name of J.P. Field et al. on Dec. 30, 2010 and entitled "Distributed Security Information and Event Management System with Application-Injected Remote Components."

* cited by examiner

*Primary Examiner* — Longbit Chai
(74) *Attorney, Agent, or Firm* — Ryan, Mason & Lewis, LLP (57) ABSTRACT

A processing device comprises a processor coupled to a memory and implements a refresh-and-rotation process to protect a system comprising information technology infrastructure from a persistent security threat. The processing device is configured to replace one or more identified resources of a resource pool of the information technology infrastructure with one or more corresponding refreshed resources so as to provide a refreshed resource pool, and to remap elements of a set of workloads running on the information technology infrastructure to elements of the refreshed resource pool in order to deter the persistent security threat. The processing device may maintain within the resource pool a set of reserve resource pool elements that have no workload elements mapped to them, and can add resource pool elements to and remove resource pool elements from the set of reserve resource pool elements in conjunction with the remapping of workload elements to resource pool elements.

22 Claims, 3 Drawing Sheets

REFRESH-AND-ROTATION PROCESS FOR MINIMIZING RESOURCE VULNERABILITY TO PERSISTENT SECURITY THREATS

FIELD OF THE INVENTION

The present invention relates generally to the field of information processing, and more particularly to protecting information technology infrastructure from security threats.

BACKGROUND OF THE INVENTION

Information technology infrastructure of a company, organization or other enterprise is continuously subject to a wide variety of security threats. For example, advanced persistent threats (APTs) represent a very sophisticated class of attacks against an enterprise. APTs are usually mounted by well-funded attackers with very specific targets. To accomplish their goals, attackers orchestrating an APT typically introduce periods of delay among different stages of the attack, advance slowly while keeping their footprint low, and control the propagation of the attack through the use of human operators.

An APT is therefore a long-duration and stealthy security threat that characteristically unfolds in a multi-stage process, with a significant interval of time between stages. Other factors that may contribute to the "low-and-slow" execution that is typical of APTs include the use of low-bandwidth covert channels, a human-directed command-and-control center, and orchestration of multiple vectors of compromise, some of which may be physical, human, political or military. A given APT may therefore combine several distinct types of attacks, such as zero-day attacks (e.g., exploitation of unpatched software vulnerabilities) and advanced social engineering attacks.

Conventional defenses against APTs are often deployed in an ad-hoc manner, without a global understanding of attackers' goals and the objectives of the enterprise under attack. Defending against APTs is further complicated by the fact that an increasing number of enterprises are reducing their costs by migrating portions of their information technology infrastructure to cloud service providers. For example, virtual data centers and other types of systems comprising distributed virtual infrastructure are coming into widespread use. Commercially available virtualization software such as VMware® vSphere™ may be used to build a variety of different types of virtual infrastructure, including cloud computing and storage systems, distributed across hundreds of interconnected physical computers and storage devices. Use of such cloud-based arrangements for at least a portion of the information technology infrastructure of a given enterprise can introduce additional challenges in defending the enterprise against APTs.

SUMMARY OF THE INVENTION

An illustrative embodiment of the present invention implements a refresh-and-rotation process to protect a system comprising information technology infrastructure from an APT or other persistent security threat.

In one aspect, a processing device comprises a processor coupled to a memory. The processing device is configured to replace one or more identified resources of a resource pool of the information technology infrastructure with one or more corresponding refreshed resources so as to provide a refreshed resource pool, and to remap elements of a set of workloads running on the information technology infrastructure to elements of the refreshed resource pool in order to deter the persistent security threat.

The processing device may additionally be configured to maintain within the resource pool a set of reserve resource pool elements that have no workload elements mapped to them, and furthermore to add and remove resource pool elements to and from the set of reserve resource pool elements in conjunction with the remapping of workload elements to resource pool elements. The particular resource pool elements selected for addition to or removal from the set of reserve resource pool elements may be randomly selected.

The remapping of elements of a set of workloads to elements of the refreshed resource pool may therefore involve reconfiguring the set of reserve resource pool elements. For example, the remapping may comprise selecting a resource pool element x from the set of reserve resource pool elements, selecting a resource pool element y from outside the set of reserve resource pool elements, remapping workload elements to resource pool elements in such a way that one or more workload elements are mapped to resource pool element x and no workload elements are mapped to resource pool element y, removing resource pool element x from the set of reserve resource pool elements, and adding resource pool element y to the set of reserve resource pool elements. One or more of the respective reserve and non-reserve elements x and y may be randomly selected.

The above-noted illustrative embodiment advantageously overcomes one or more of the above-noted drawbacks of conventional approaches to defending against APTs and other types of persistent security threats, particularly in large-scale cloud systems that comprise distributed virtual infrastructure.

These and other features and advantages of illustrative embodiments of the present invention will become more readily apparent from the accompanying drawings and the following detailed description.

DETAILED DESCRIPTION

The present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising cloud computing or storage systems, as well as other types of processing systems comprising physical or virtual processing resources in any combination.

Figure 1A:
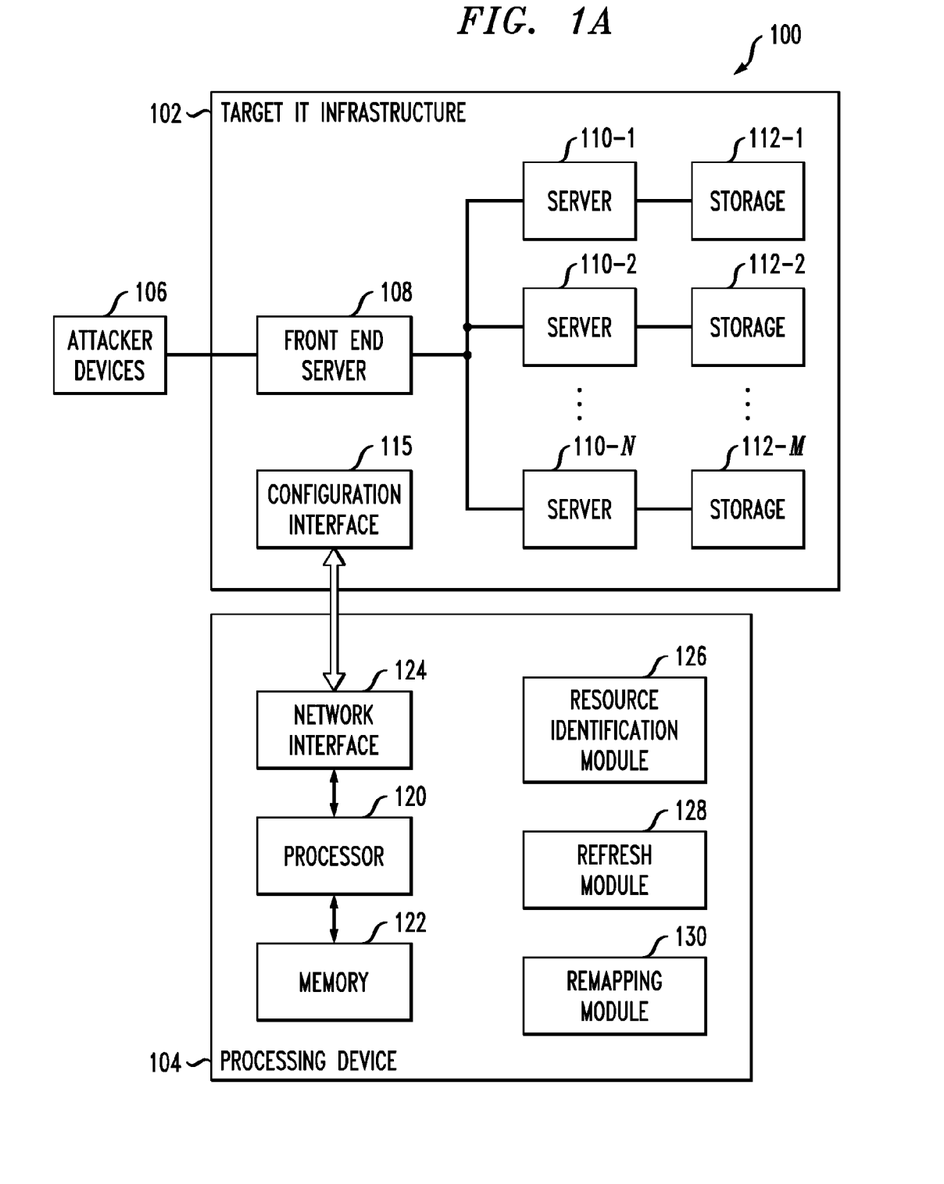
FIG. 1A is a block diagram of an information processing system that implements a refresh-and-rotation process for deterrence of persistent security threats in an illustrative embodiment of the invention.

FIG. 1A shows an information processing system 100 configured with refresh-and-rotation functionality for deterring persistent security threats in an illustrative embodiment of the invention. The system 100 in this embodiment comprises target information technology (IT) infrastructure 102 that is coupled to an additional processing device 104, which may comprise a separate computer or server. The IT infrastructure 102 of system 100 is the target of an APT or other persistent security threat from an attacker associated with one or more attacker devices 106, which may also comprise computers, servers or other types of processing devices, in any combination. These attacker devices 106 in the present embodiment access the target IT infrastructure 102 via a front end server 108. The target IT infrastructure 102 further comprises a plurality of servers 110-1, 110-2, . . . 110-N coupled to the front end server 108, as well as a plurality of storage devices 112-1, 112-2, . . . 112-M, where N and M are arbitrary numbers. One or more of the servers 108 and 110 may comprise servers running web applications, such as, for example, file transfer protocol (FTP) servers, although a wide variety of other types of servers may be used.

The servers 108 and 110 and the storage devices 112 of IT infrastructure 102 may be viewed as examples of what are more generally referred to herein as "processing devices" and may collectively comprise one or more processing platforms in which processing devices are configured to communicate with one another over a network. An example of such a processing platform will be described in conjunction with FIG. 2. Multiple system elements may be implemented by a single processing device in a given embodiment.

The various servers 110 and storage devices 112 of the target IT infrastructure 102 may comprise, for example, cloud-based distributed infrastructure used to provide one or more services for an associated enterprise, including, but not limited to, Infrastructure as a Service (IAAS), Platform as a Service (PAAS), and Software as a Service (SAAS).

The processing device 104 communicates with the target IT infrastructure 102 via a configuration interface 115. Although shown in the figure as being separate from the target IT infrastructure 102 of the system 100, in other embodiments the processing device 104 may be implemented within the target IT infrastructure.

The processing device 104 in the present embodiment comprises a processor 120 coupled to a memory 122. The processor 120 may comprise a microprocessor, a microcontroller, an application-specific integrated circuit (ASIC), a field programmable gate array (FPGA) or other type of processing circuitry, as well as portions or combinations of such circuitry elements. The memory 122 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by processing device 104 causes the device to perform functions associated with a refresh-and-rotation process for deterrence of persistent security threats to the IT infrastructure 102. One skilled in the art would be readily able to implement such software given the teachings provided herein. Other examples of computer program products embodying aspects of the invention may include, for example, optical or magnetic disks.

Also included in the processing device 104 is network interface circuitry 124, which is used to interface the processing device with the target IT infrastructure 102 via configuration interface 115. Such network interface circuitry may comprise conventional transceivers of a type well known in the art.

The processing device 104 further comprises a number of functional modules utilized to deter APTs or other persistent security threats to the IT infrastructure 102, including a resource identification module 126, a refresh module 128, and a remapping module 130. One or more of these modules interact with elements of the target IT infrastructure 102 via its configuration interface 115. For example, resources of the target IT infrastructure may be identified, refreshed and remapped via the configuration interface 115. Other types of wired or wireless connections between the processing device 104 and the IT infrastructure 102 may be used for allowing resources of the target IT infrastructure may be identified, refreshed and remapped in the manner disclosed herein.

It should be noted that this particular set of modules 126, 128 and 130 for implementing the refresh-and-rotation functionality of the system 100 is presented by way of example, and in other embodiments additional or alternative modules may be used. Also, the functionality associated with separate modules in the FIG. 1A embodiment may be combined into a smaller set of functional modules or separated into a larger set of functional modules in other embodiments.

One or more of the modules 126, 128 and 130 of the processing device 104 may be implemented at least in part in the form of software that is stored by memory 122 and executed by processor 120. Accordingly, such modules need not be separate from the processor and memory elements as is illustratively shown in FIG. 1A.

It should also be understood that a given embodiment of the system 100 may include multiple instances of the elements 102, 104 and 106, although only single instances of such elements are shown in the system diagram for clarity and simplicity of illustration. For example, separate instances of processing device 104 with refresh-and-rotation functionality may be provided for different portions of the IT infrastructure 102, or for each of a plurality of different instances of such IT infrastructure.

Figure 1B:
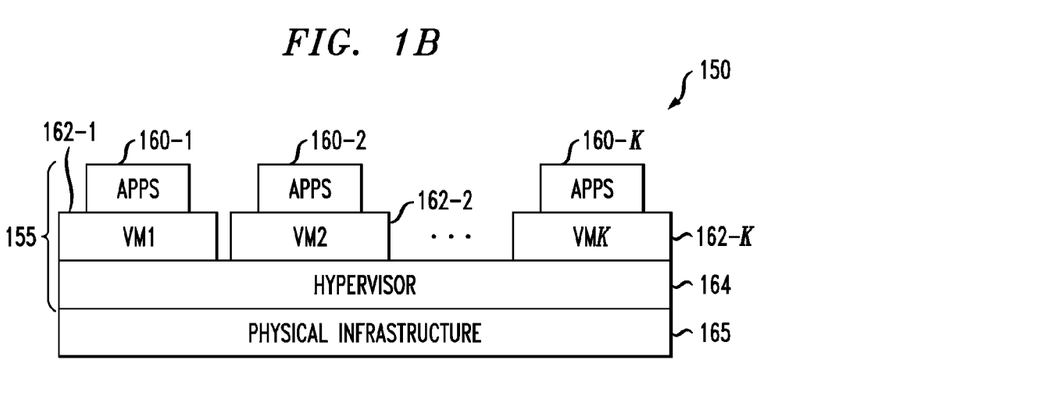
FIG. 1B illustrates a portion of the information technology infrastructure of the FIG. 1A information processing system comprising a plurality of virtual machines under the control of a hypervisor.

At least a portion 150 of the target IT infrastructure 102 may comprise virtual infrastructure 155 as shown in FIG. 1B, which in this embodiment includes, by way of example, sets of applications 160-1, 160-2, . . . 160-K running on respective virtual machines (VMs) 162-1, 162-2, . . . 162-K under the control of a hypervisor 164. These virtual infrastructure elements are associated with underlying physical infrastructure 165, and may collectively implement, for example, at least a portion of a virtual data center (VDC). Although only a single hypervisor is shown in the example of FIG. 1B, a given VDC configured in accordance with the invention may include multiple hypervisors, each running on its own physical machine or set of physical machines.

An example of a commercially available hypervisor platform suitable for use in implementing virtual infrastructure 155 is the VMware® vSphere™ which may include an associated management system such as vCenter™. The underlying physical infrastructure 165 may comprise one or more distributed processing platforms that include storage hardware products such as Celerra® and CLARiiON®, both commercially available from EMC Corporation of Hopkinton, Mass. A variety of other storage products, such as VNX and Symmetrix VMAX, both also from EMC Corporation, may be utilized to implement at least a portion of the target IT infrastructure 102.

The target IT infrastructure 102 may additionally or alternatively comprise a security information and event management (SIEM) system as described in U.S. patent application Ser. No. 12/982,288, filed Dec. 30, 2010 and entitled "Distributed Security Information and Event Management System with Application-Injected Remote Components," which is commonly assigned herewith and incorporated by reference herein. The techniques disclosed therein can be used to enhance the functionality of a centralized SIEM system such as the enVision® platform commercially available from RSA, The Security Division of EMC Corporation.

In addition, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

It is therefore to be appreciated that the particular arrangements of system elements shown in FIGS. 1A and 1B are presented by way of illustrative example only, and in other embodiments different arrangements of additional or alternative elements may be used. Moreover, the functionalities associated with separate elements in the FIG. 1A embodiment may be combined into a lesser number of elements each of which performs multiple functions. Thus, at least a subset of the elements may be collectively implemented on a common processing platform, or each such element may be implemented on a separate processing platform comprising one or more servers, computers or other processing devices. For example, the IT infrastructure 102 and additional processing device 104 may each run on a separate processing platform, or portions of such elements may run on the same platform.

Figure 2:
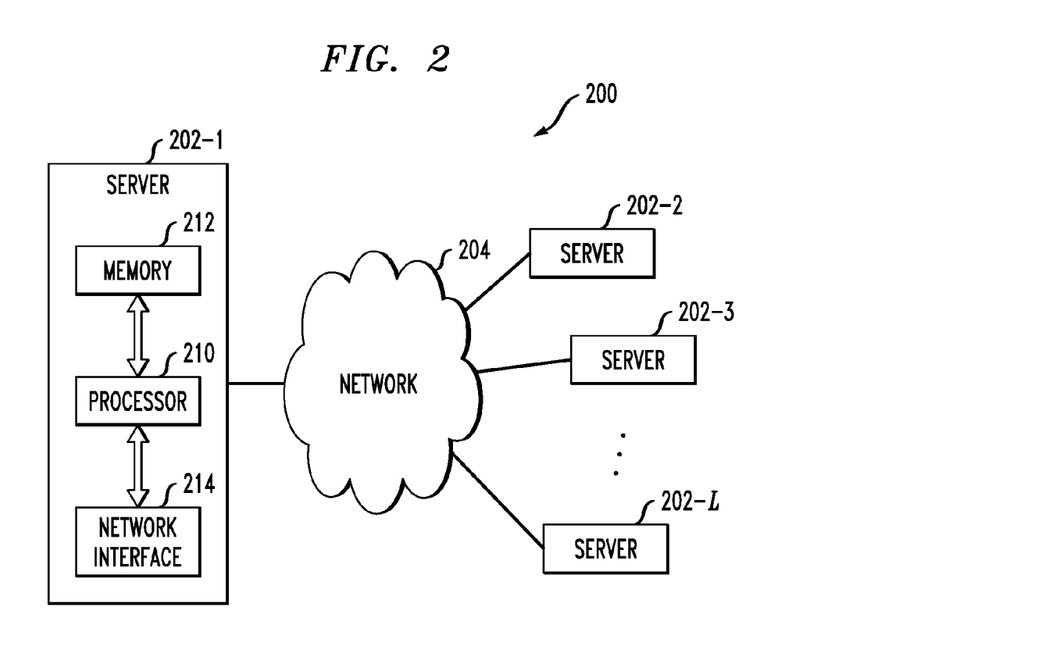
FIG. 2 is a block diagram of an exemplary processing platform that may be utilized to implement at least a portion of the FIG. 1A information processing system.

Another example of a processing platform that may be used to implement at least a portion of the information processing system 100 is processing platform 200 shown in FIG. 2. The processing platform 200 in this embodiment comprises at least a portion of the system 100 and includes a plurality of servers, denoted 202-1, 202-2, 202-3, . . . 202-L, which communicate with one another over a network 204. One or more of the elements within the system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of the system 100. For example, the processing device 104 may be implemented using one or more of the servers 202. Again, multiple system elements may be implemented by a single processing device in a given embodiment.

A given one of the servers 202-1 in the processing platform 200 comprises a processor 210 coupled to a memory 212. Also included in the server 202-1 is network interface circuitry 214, which is used to interface the server with the network 204 and other system components.

Such circuitry may comprise conventional transceivers of a type well known in the art. The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

The operation of the information processing system 100 will now be described in greater detail with reference to the flow diagram of FIG. 3.

Figure 3:
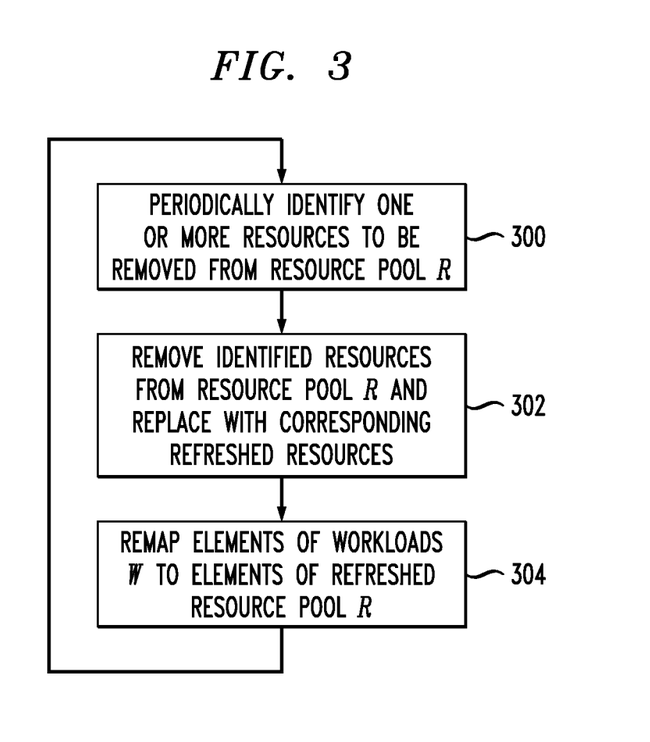
FIG. 3 is a flow diagram of the refresh-and-rotation process implemented in the system of FIG. 1A.

FIG. 3 shows a refresh-and-rotation process for deterrence of persistent security threats in the information processing system 100. The process includes steps 300 through 304 as shown, and these steps in the present embodiment are implemented primarily by the processing device 104, although in other embodiments one or more such steps may be implemented by other system elements, or by the processing device 104 operating in conjunction with another system element, such as a component of the IT infrastructure 102.

In step 300, one or more resources to be removed from a resource pool R are identified. This step may be implemented by the resource identification module 126 of processing device 104. The resources of the resource pool may be, for example, computation or storage resources associated with elements of the IT infrastructure 102 that are subject to the persistent security threat. As a more particular example, the resource pool elements may comprise software execution stacks of respective physical hosts in physical infrastructure 165 and the workload elements may comprise applications 160 or virtual machines 162 that run using the software execution stacks of the respective physical hosts. As another example, the resource pool elements may comprise respective server instances 202 and the workload elements may comprise respective document requests to be serviced by the server instances.

In step 302, the one or more identified resources are removed from the resource pool R and replaced with one or more corresponding refreshed resources to provide a refreshed resource pool. This step may be implemented by the refresh module 128 of processing device 104, and in the present embodiment provides what is referred to herein as a "trusted refresh," which may be implemented through re-initialization of a resource from a trusted source. This may involve, for example, rebooting of a host with a trusted execution stack. Its effect is to remove a resource instance and replace it with a fresh one.

In step 304, elements of a set of workload elements W running on the IT infrastructure 102 are remapped to elements of the refreshed resource pool in order to deter the persistent security threat. This step may be implemented by the remapping module 130 of processing device 104. The workload elements are also referred to herein as simply "workloads." The remapping provides resource rotation within the pool through the movement of workloads around resources.

As indicated in the figure, steps 300, 302 and 304 are repeated periodically as needed. For example, these steps may be repeated periodically in accordance with a specified refresh-and-rotation interval of the resource pool R. The refresh-and-rotation interval may be selected to limit duration of potential contacts between an attacker and resource pool elements.

Advantageously, the illustrative process of FIG. 3 can be used to defend the IT infrastructure 102 against APTs and other types of persistent security threats, particularly in large-scale cloud systems that comprise distributed virtual infrastructure.

The particular processing operations and other system functionality described in conjunction with the flow diagram of FIG. 3 are presented by way of illustrative example only, and should not be construed as limiting the scope of the invention in any way. Alternative embodiments can use other types of processing operations for implementation of a refresh-and-rotation process for deterrence of persistent security threats. For example, the ordering of the process steps may be varied in other embodiments, or certain steps may be performed concurrently with one another rather than serially. Also, additional or alternative process steps may be used.

Figure 4:
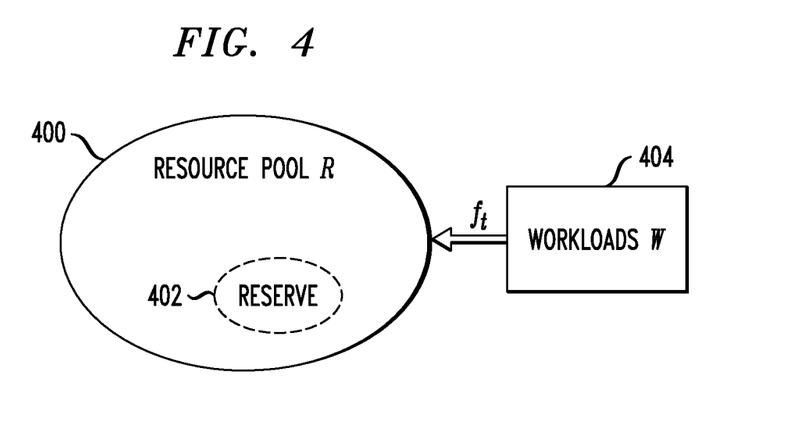
FIG. 4 shows an example of a mapping between a set of workloads and a resource pool in an illustrative embodiment.

FIG. 4 shows an example of a mapping between the set of workload elements W (e.g., virtual machines, applications, document requests, etc.) and the resource pool R (e.g., physical hosts, software execution stacks, server instances, etc.). The resource pool, which is also denoted by reference numeral 400 in this example, comprises a set 402 of reserve resource pool elements, also referred to simply as reserve 402. The set of reserve resource pool elements have no workload elements mapped to them. The set of workload elements W, also denoted by reference numeral 404, is therefore mapped to elements of the resource pool outside of the reserve 402.

Accordingly, at a given point in time t, at least a portion of the IT infrastructure 102 may be characterized by a mapping of workload elements to resource pool elements. This mapping is denoted by the function $f_t$ in FIG. 4. The mapping $f_t$ may be dictated at least in part by environmental conditions as well as workload and resource behavior, but may also be determined at least in part by a service provider or other defender of the IT infrastructure 102. The remapping applied in step 304 of the FIG. 3 flow diagram may be viewed as altering the mapping $f_t$ in a manner that limits an amount of time that any particular workload element is mapped to any particular resource pool element.

The processing device 104 is operative to maintain the reserve 402. For example, the processing device may periodically remove one or more resource pool elements from the set of reserve resource pool elements so as to allow one or more workload elements to be mapped to the one or more removed resource pool elements. As another example, the processing device may periodically add one or more resource pool elements to the set of reserve resource pool elements so as to prevent one or more workload elements from being mapped to the one or more added resource pool elements.

The remapping implemented in step 304 of the FIG. 3 flow diagram may therefore involve reconfiguring the reserve 402. For example, this remapping step may comprise selecting a resource pool element x from the set of reserve resource pool elements, selecting a resource pool element y from outside the set of reserve resource pool elements, remapping workload elements to resource pool elements in such a way that one or more workload elements are mapped to resource pool element x and no workload elements are mapped to resource pool element y, removing resource pool element x from the set of reserve resource pool elements, and adding resource pool element y to the set of reserve resource pool elements. The ordering of the steps may be varied, such that, for example, x is removed from the reserve and y is added to the reserve prior to initiation or completion of any remapping involving these elements. The selection of one or more of the respective reserve and non-reserve elements x and y may be random selection, in order to prevent an attacker from exploiting a resource-rotation schedule. A variety of other types of remapping processes involving modification of the reserve 402 may be used in other embodiments.

In the embodiments illustrated in FIGS. 3 and 4, the IT infrastructure 102 is periodically reconfigured in order to deter APTs or other persistent security threats. The reconfiguration makes use of virtualization when available in order to facilitate resource reallocation. The goal is to slow or disrupt persistent attacks by minimizing the duration of contact between an attacker and its targets. This may be achieved by minimizing the overall time that a workload in W is mapped to any given resource in R. Trusted refresh has the effect of removing a resource from the pool R and replacing it with a new one (e.g., replacing an instantiated software stack with a fresh one), thereby ensuring that resources are short-lived and minimizing the time that workloads are mapped to them. Resource rotation remaps elements of W to elements of R so as to minimize workload-to-resource durations evenly across resources.

The use of the reserve 402 addresses situations in which a resource cannot be easily removed from the resource pool R because it has certain workloads mapped to it (e.g., it is challenging to reboot a server with workloads executing on it). The reserve may at times be empty. As described previously, the processing device 104 that maintains the reserve can periodically withdraw an element from the reserve and replace it with a fresh one, using the above random selection and migration approach involving respective reserve and non-reserve elements x and y.

A number of examples will now be described in greater detail in order to further illustrate the operation of the refresh-and-rotation process of FIG. 3.

Consider a first example in which the defender is a cloud service provider that implements a VDC using the IT infrastructure 102 and the attacker is a tenant of the cloud service provider and has a number of virtual machines running in the VDC. The goal of this service provider is to minimize the duration of contact that the virtual machines of the tenant have with a given running instance of an execution stack (e.g., up through the hypervisor). This may be useful in cases where, for example, the tenant requires an extended period of time to compromise a given host via a virtual machine escape.

In this example, the resource pool R comprises software execution stacks and the workloads W comprise virtual machines. In accordance with the FIG. 3 refresh-and-rotation process, the service provider may maintain a small reserve of physical hosts and corresponding software execution stacks with no actively executing virtual machines. The service provider periodically picks a physical host x from this reserve and identifies a physical host y from outside the reserve, and then re-initializes the software execution stack of host x. This may involve, for example, reflashing the basic input/output system (BIOS) code, and then booting up through the hypervisor using a Trusted Platform Module (TPM) protocol, which has the effect of removing a software execution stack from R and replacing it with a new one. The service provider then migrates the workload of the identified physical host y to x, removes x from the reserve and adds y to the reserve.

The above-described actions of the service provider as well as those described in the additional examples below in a given embodiment may be implemented at least in part by the processing device 104, which in these examples is assumed to be under the control of the service provider.

In a second example, one tenant of the cloud service provider is an attacker that attempts to exfiltrate sensitive information from another tenant of that service provider. It is assumed for this example that in order to maximize resource use, the service provider will co-locate virtual machines of different tenants on the same physical host. The attacker tenant seeks to exfiltrate the sensitive information through a side-channel attack (e.g., using an L2 cache side-channel). That tenant therefore launches virtual machines until one is co-located with a virtual machine of the target tenant, and then exploits the resulting exposed side-channel.

To defend against this attack, the service provider periodically rotates virtual machines randomly around physical hosts, such that the attacking tenant has only a very limited time in which to attempt to advance the side-channel attack. It should be noted that, in practice, resource-use efficiency may constrain the service provider to co-locate virtual machines with complementary workloads.

In this example, the resource pool R may be viewed as the set of physical hosts running the virtual machines of the target tenant, and the set of workloads W is the set of virtual machines that belong to tenants other than the target tenant. Although the service provider cannot easily replace elements of R with new ones, it can rotate workloads through R to minimize the duration of any given workload-resource contact over time. The service provider can similarly view the execution environments of each of its tenants as a set of resources R to be protected, and to implement a global policy for rotation of virtual machines across all of these tenants.

In a third example, it is assumed that a service provider runs a set of FTP servers. When a given document request is received, it is mapped to one of the servers for response. A malicious request, such as one carrying a buffer-overflow attack, could compromise the server to which it is assigned.

The resource pool R in this example comprises the set of FTP server instances, and the set of workloads W comprises the document requests. If a document request compromises a server, it may be viewed as remaining permanently mapped to that server instance. The service provider therefore periodically re-instantiates server instances, for example, by withdrawing server instances from the resource pool R and re-initializing them with fresh server instances. In this way, the service provider minimizes the overall duration of a mapping of any given workload in W to a particular resource in R.

In the foregoing examples, the attacker is looking to compromise a target software resource. However, the refresh-and-rotation process of FIG. 3 may also be used to protect a wide variety of other types of resources, including computing resources, network resources and data resources, from persistent security threats. For example, the resource pool R could be a set of physical drives to which virtual drives of a target tenant are mapped, while the workloads in W may be virtual drives of an attacker tenant. If the attacker tenant attempts to exploit a side-channel that is latent in the physical drives, the refresh-and-rotation process can be an effective countermeasure. The refresh-and-rotation process can be similarly applied to the other types of resources noted above.

It should be noted that in implementing a refresh-and-rotation process, a service provider must ensure that the underlying refreshes and rotations are effective, and could otherwise risk actually exacerbating a compromise rather than containing it. Suppose in the first example above, for instance, that the re-initialization process for refreshing elements in the reserve is ineffective at purging a particular piece of malware. Then rotating workloads will actually have the effect of exposing many virtual machines to an infected platform, while leaving workloads in place would, conversely, have the effect of containing the damage. In this case, the failure of the service provider to implement the refresh-and-rotation policy effectively creates a new vulnerability.

Similarly, in the second example above, while resource rotation may minimize the duration of contact between the attacker and target tenants, it increases the number of tenants that come into contact with the attacker tenant. If the goal of the attacker tenant is to exfiltrate sensitive information from a particular target tenant through a low-bandwidth side-channel, then rotation indeed disrupts this objective. But if the attacker tenant is able to compromise a co-tenant rapidly when first co-located with that tenant, then rotation will have the effect of increasing the number of co-tenants vulnerable to attack.

It is therefore important when deploying the refresh-and-rotation techniques disclosed herein to take into account the actual effectiveness of the underlying refreshes and rotations in a particular implementation, as well as the likely objectives of an attacker.

As indicated previously, functionality such as that described in conjunction with the flow diagram of FIG. 3 can be implemented at least in part in the form of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, IT infrastructure and processing devices, refresh-and-rotation processes, and persistent security threats. Also, one or more of the disclosed techniques may be implemented as part of a re-hosting defense to an APT or other persistent security threat. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
   identifying one or more resources to be removed from a resource pool associated with information technology infrastructure subject to a persistent security threat;
   replacing the one or more identified resources with one or more corresponding refreshed resources to provide a refreshed resource pool; and
   remapping elements of a set of workloads running on the information technology infrastructure to elements of the refreshed resource pool, wherein the information technology infrastructure is configured with a mapping of workload elements to resource pool elements and remapping the workload elements comprises altering said mapping in accordance with a refresh-and-rotation interval that limits an amount of time that a particular workload element is mapped to a particular resource pool element in order to deter the persistent security threat;
   wherein the identifying, replacing and remapping steps are performed by a processing device comprising a processor coupled to a memory.

2. The method of claim 1 wherein the identifying, replacing and remapping steps are repeated periodically in accordance with a specified refresh-and-rotation interval of the resource pool.

3. The method of claim 2 wherein the refresh-and-rotation interval is selected to limit duration of potential contacts between an attacker and resource pool elements.

4. The method of claim 1 wherein the remapping step alters said mapping in a manner that limits an amount of time that any particular workload element is mapped to any particular resource pool element.

5. The method of claim 1 further comprising the step of maintaining within the resource pool a set of reserve resource pool elements wherein said reserve resource pool elements have no workload elements mapped to them.

6. The method of claim 5 further comprising the step of periodically removing one or more resource pool elements from the set of reserve resource pool elements so as to allow one or more workload elements to be mapped to the one or more removed resource pool elements.

7. The method of claim 5 further comprising the step of periodically adding one or more resource pool elements to the set of reserve resource pool elements so as to prevent one or more workload elements from being mapped to the one or more added resource pool elements.

8. The method of claim 1 wherein the remapping step further comprises:
    selecting a resource pool element x from a set of reserve resource pool elements;
    selecting a resource pool element y from outside the set of reserve resource pool elements;
    remapping workload elements to resource pool elements in such a way that one or more workload elements are mapped to resource pool element x and no workload elements are mapped to resource pool element y;
    removing resource pool element x from the set of reserve resource pool elements; and
    adding resource pool element y to the set of reserve resource pool elements.

9. The method of claim 8 wherein at least one of the selecting steps comprises randomly selecting the resource pool element.

10. The method of claim 1 wherein the resource pool elements comprise software execution stacks of respective physical hosts and the workload elements comprise respective virtual machines that run using the software execution stacks of the respective physical hosts.

11. The method of claim 1 wherein the resource pool elements comprise respective server instances and the workload elements comprise respective document requests to be serviced by the server instances.

12. The method of claim 1 further comprising the step of implementing the processing device within the information technology infrastructure.

13. A computer program product comprising a non-transitory processor-readable storage medium having encoded therein executable code of one or more software programs, wherein the one or more software programs when executed by the processing device implement the steps of the method of claim 1.

14. An apparatus comprising:
    at least one processing device comprising a processor coupled to a memory;
    wherein the memory is configured to store information characterizing a mapping between the resource elements of a resource pool associated with information technology infrastructure subject to a persistent security threat and elements of a set of workloads running on the information technology infrastructure;
    wherein the processing device under control of the processor is operative to replace one or more identified resources of the resource pool with one or more corresponding refreshed resources to provide a refreshed resource pool, and to remap elements of the set of workloads to elements of the refreshed resource pool, wherein the information technology infrastructure is configured with a mapping of workload elements to resource pool elements and remapping the workload elements comprises altering said mapping in accordance with a refresh-and-rotation interval that limits an amount of time that a particular workload element is mapped to a particular resource pool element in order to deter the persistent security threat.

15. The apparatus of claim 14 wherein the processing device is implemented within the information technology infrastructure.

16. The apparatus of claim 14 wherein the information technology infrastructure comprises distributed virtual infrastructure of a cloud service provider.

17. The apparatus of claim 14 wherein the processing device is further configured to maintain within the resource pool a set of reserve resource pool elements wherein said reserve resource pool elements have no workload elements mapped to them.

18. An apparatus comprising:
    at least one processing device comprising a processor coupled to a memory;
    wherein the memory is configured to store information characterizing a mapping between the resource elements of a resource pool associated with information technology infrastructure subject to a persistent security threat and elements of a set of workloads running on the information technology infrastructure;
    wherein the processing device under control of the processor is operative to replace one or more identified resources of the resource pool with one or more corresponding refreshed resources to provide a refreshed resource pool, and to remap elements of the set of workloads to elements of the refreshed resource pool in order to deter the persistent security threat;
    wherein the processing device is further configured to maintain within the resource pool a set of reserve resource pool elements wherein said reserve resource pool elements have no workload elements mapped to them; and
    wherein the processing device is further operative to periodically remove one or more resource pool elements from the set of reserve resource pool elements so as to allow one or more workload elements to be mapped to the one or more removed resource pool elements, and to periodically add one or more resource pool elements to the set of reserve resource pool elements so as to prevent one or more workload elements from being mapped to the one or more added resource pool elements.

19. An information processing system comprising:
    information technology infrastructure subject to a persistent security threat; and
    at least one processing device;
    wherein the processing device is configured to replace one or more identified resources of a resource pool of the information technology infrastructure with one or more corresponding refreshed resources to provide a refreshed resource pool, and to remap elements of a set of workloads running on the information technology infrastructure to elements of the refreshed resource pool, wherein the information technology infrastructure is configured with a mapping of workload elements to resource pool elements and remapping the workload elements comprises altering said mapping in accordance with a refresh-and-rotation interval that limits an amount of time that a particular workload element is mapped to a particular resource pool element in order to deter the persistent security threat.

20. The information processing system of claim 19 wherein the information technology infrastructure comprises at least one processing platform comprising a plurality of processing devices with each such processing device of the processing platform comprising a processor coupled to a memory.

21. A method comprising the steps of:

identifying one or more resources to be removed from a resource pool associated with information technology infrastructure subject to a persistent security threat;

replacing the one or more identified resources with one or more corresponding refreshed resources to provide a refreshed resource pool;

remapping elements of a set of workloads running on the information technology infrastructure to elements of the refreshed resource pool in order to deter the persistent security threat;

maintaining within the resource pool a set of reserve resource pool elements wherein said reserve resource pool elements have no workload elements mapped to them;

periodically removing one or more resource pool elements from the set of reserve resource pool elements so as to allow one or more workload elements to be mapped to the one or more removed resource pool elements; and periodically adding one or more resource pool elements to the set of reserve resource pool elements so as to prevent one or more workload elements from being mapped to the one or more added resource pool elements;

wherein the identifying, replacing, remapping, maintaining, periodically removing and periodically adding steps are performed by a processing device comprising a processor coupled to a memory.

22. An information processing system comprising:

information technology infrastructure subject to a persistent security threat; and at least one processing device;

wherein the processing device is configured to replace one or more identified resources of a resource pool of the information technology infrastructure with one or more corresponding refreshed resources to provide a refreshed resource pool, and to remap elements of a set of workloads running on the information technology infrastructure to elements of the refreshed resource pool in order to deter the persistent security threat;

wherein the processing device is further configured to maintain within the resource pool a set of reserve resource pool elements wherein said reserve resource pool elements have no workload elements mapped to them; and wherein the processing device is further operative to periodically remove one or more resource pool elements from the set of reserve resource pool elements so as to allow one or more workload elements to be mapped to the one or more removed resource pool elements, and to periodically add one or more resource pool elements to the set of reserve resource pool elements so as to prevent one or more workload elements from being mapped to the one or more added resource pool elements.

\* \* \* \* \*